H. HERMANI 1,500,617

BOX-HINGING MACHINE

Filed Sept. 16, 1921   10 Sheets-Sheet 8

Inventor
by Henry Hermani,
Meyers, Cavanagh, Whitehead & Hyde
Attorneys

July 8, 1924.

H. HERMANI

BOX HINGING MACHINE

Filed Sept. 16, 1921    10 Sheets-Sheet 9

Inventor
Henry Hermani,
by
Meyers, Cavanagh, Whitehead & Hyde
Attorneys

Patented July 8, 1924.

1,500,617

UNITED STATES PATENT OFFICE.

HENRY HERMANI, OF BALTIMORE, MARYLAND, ASSIGNOR TO THE TIN DECORATING COMPANY OF BALTIMORE, OF BALTIMORE, MARYLAND, A CORPORATION OF NEW JERSEY.

BOX-HINGING MACHINE.

Application filed September 16, 1921. Serial No. 501,174.

*To all whom it may concern:*

Be it known that I, HENRY HERMANI, a citizen of the United States, and resident of 5100 Palmer Avenue, in the city of Baltimore and State of Maryland, have invented certain new and useful Improvements in Box-Hinging Machines, of which the following is a specification.

The invention relates to a machine for bringing together complemental box parts provided with hinge members, interconnecting the hinge members of the two parts, and completing the hinge formation to form a complete hinged box.

In the particular example chosen for illustration, the machine is arranged to handle substantially rectangular and relatively shallow box bodies and tops, of which the bodies are provided with hinge pintles and the tops are provided with partly formed hinge hooks to cooperate with the pintles. The box bodies are supplied successively and automatically to a conveyor and at a certain point in their travel the box tops are fed to a position adjacent to the bodies; a top is placed in juxtaposition to a body and the top hinge hook is engaged with the body pintle; the initially assembled box is then advanced and at a subsequent position the hinge hook is clenched about the pintle, completing the hinge assembly of the box parts, and the completed boxes are then successively discharged from the machine. Desirably, as provided for in the present embodiment, the boxes are closed prior to discharge.

The present machine has been especially adapted and operated in connection with a machine for providing the box bodies with hinge pintles, disclosed in the patent to me, No. 1,267,409 of May 28, 1918. In such machine the box body blanks are advanced and at certain positions are automatically operated upon to provide pintle ears, pintles are inserted in the ears, and the bodies are discharged in a channel or chute. An extension of the discharge chute just mentioned, supplies the hinge pintled box bodies to the present mechanism for associating the bodies with box tops, connecting the hinge members and clinching the top hinge members about the pintles. By this arrangement a complete automatic machine is provided for forming or providing the box bodies with hinge members, specifically pintles in the present case, advancing the bodies, advancing box tops provided with hinge members, effecting an initial hinge connection of the tops and bodies and completing the connection by bending the top hinge members or hooks about the body pintles.

It is to be understood that the invention is not limited to the precise box and hinge forms shown, but that by a suitable adaptation within the principles of the invention, the machine may operate upon different forms of boxes and hinge members. Also, evidently, many changes may be made in features of construction, within the principles disclosed by the described embodiment; and I contemplate the employment of any structures which are properly within the scope of the appended claims.

The characteristics and advantages of the invention are sufficiently further explained in connection with the following detail description of the accompanying drawings which show one exemplifying embodiment of the invention.

The frame of the machine comprises end pedestals or legs 1 and a table 2. The table has in its upper surface a box body channel 3 and in the bottom of this channel is another channel 4 to accommodate the conveyor chain 5. This chain runs over a forward sprocket 6 and a rear sprocket 7 carried respectively by shafts 8 and 9. At regular intervals the chain is provided with cleats or lugs 10.

Figure 17:
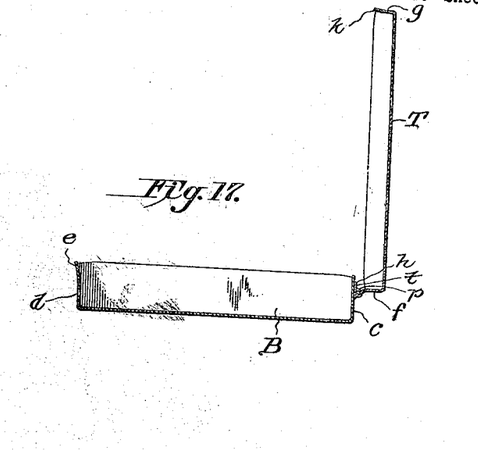
Figs. 17 to 20 are sectional views of a box in progressive stages, as operated upon by the machine.

Fig. 17 shows a typical box, for the handling of which the machine in the present embodiment is adapted. The box consists of a sheet metal body B of moderate depth, on one wall $c$ of which is provided a hinge pintle $p$, usually of wire, secured in ears pressed in the metal of the box wall and so arranged that moderate clearance is left between the pintle and the adjacent wall. The opposite or front wall $d$ of the body usually has its upper edge curved outward as at $e$ to form a yielding closure engagement with the top when the top is closed after assembly. The box cover or top T is of a shape generally corresponding to that of the body, but of slightly larger outline so as to telescope over the body, and the side walls of the top are usually lower than those of the body. One side wall $f$ of the top is provided with a partly formed hinge hook $h$ comprising a semicircular bend or loop $b$ and a projecting straight tongue $t$. The opposite side wall $g$ is slightly flared as at $k$ to more readily pass over and cooperate with the body flare $e$.

Figure 2:
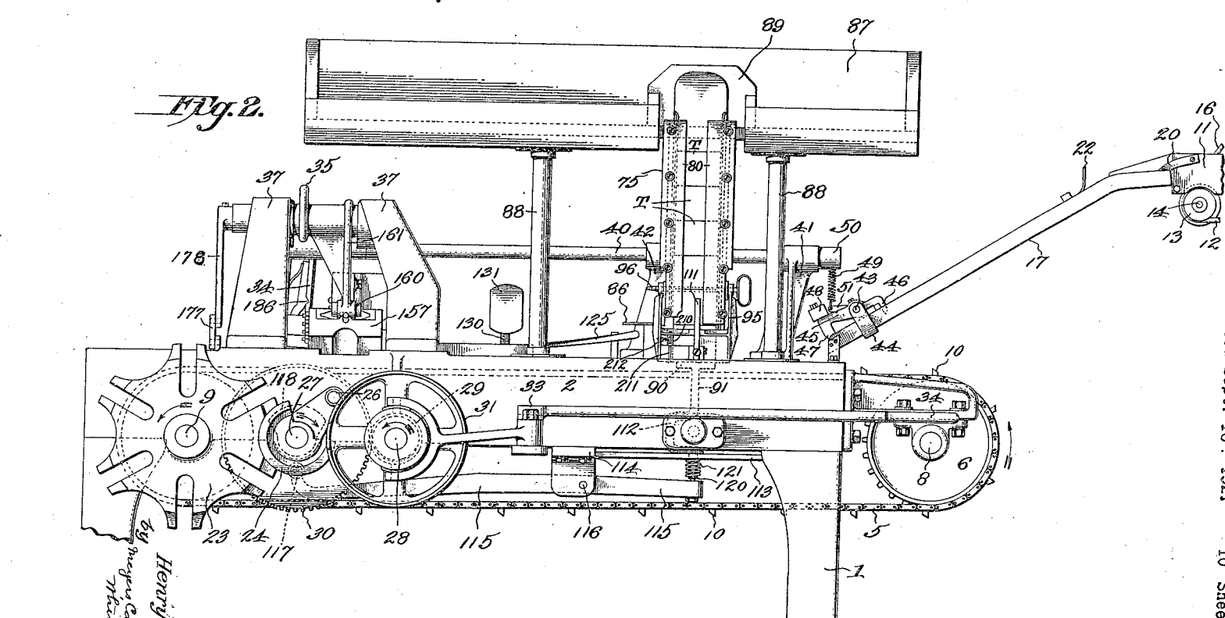
Fig. 2 is a left side elevation, that is an elevation from the lower side of the machine as it is viewed in Fig. 1.
Figure 3:
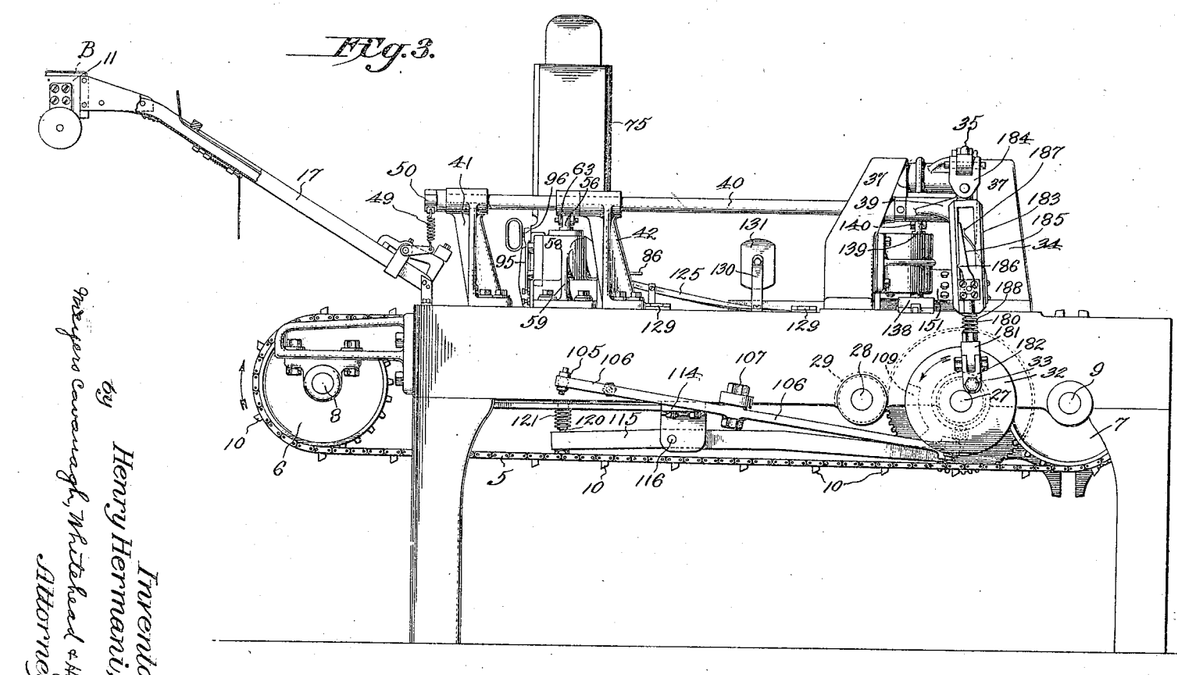
Fig. 3 is an opposite or right hand side elevation.
Figure 8:
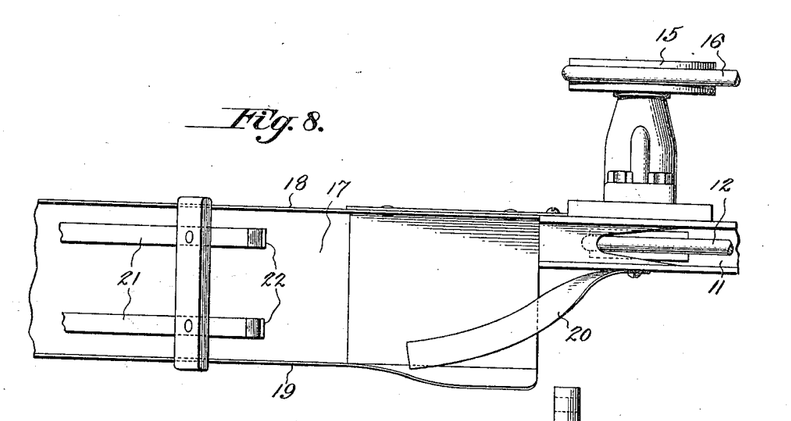
Fig. 8 is a top plan of a part of the box body feed chute and associated mechanism.

Box bodies B are in one convenient manufacturing arrangement forwarded from a machine which provides them with hinge pintles $p$, in continuous succession through a trough 11, Figs. 2, 3 and 8. The trough or channel 11 is in this particular case a continuation of the carrier channel of a machine such as that disclosed in my Patent 1,267,409, previously referred to, and the present mechanism, therefore, operates in connection with such a machine to accomplish by entirely automatic operations the formation on or application to box bodies of suitable hinge members, such as pintles, the proper presentation of these bodies to an assembly point, the forwarding to the assembly point of complemental box parts, such as tops provided with hinge members, such as hooks, the initial assembly of the respective bodies and tops, and finally the clinching of the hinge hooks about the pintles to form complete hinged boxes. The present mechanism is operated in connection with such machines as the patented machine, or is driven in more or less exactly timed relation to said machine, so that normally the box bodies are forwarded and the hinging operations are completed at about the same speed that the box bodies are delivered by the said patented machine. However, since the convenient length of the trough 11 is usually great enough to accommodate a substantial number of the pintled bodies, the present assembly mechanism may continue in operation during a temporary stoppage of the pintling mechanism; also in case of prolonged stoppage of the pintling mechanism for any reason, pintled bodies may be supplied by hand to the channel or trough 11.

The bodies stand on edge in trough 11 with the sides $d$ downward and with the open faces of the bodies all facing in the same direction, as they come from the carrier channel of a machine such as the patented machine above referred to, this arrangement being so that the open faces of the body are toward the observer in Fig. 3. In this position the box side walls $d$ rest on a conveyor belt 12, a short portion of which is shown in Figs. 2 and 8. This end of the belt is carried by a pulley 13 mounted on a shaft 14 and driven by another pulley 15 and a belt 16. The trough 11 discharges into a wider shallow trough 17 having side walls 18 and 19, the side wall 18 being substantially in line with one of the side walls of trough 11. As the box bodies are discharged onto the flat bottom of trough 17 they tend to tip over by reason of the tilt imparted to them by the curved lips $e$, and are guided in their fall by a curved guide rail 20, so that they assume flat right-side-up position in the trough 17 and descend therein by gravity under guide rails 21, the hinge pintles being all arranged at the same side of the trough, that is the side which is lowermost as observed in Fig. 8. The initial ends of the guide rails 21 are curved upward as at 22. The lower end of trough 17 is adjacent to the conveyor chain 5 near the forward end of the table and at this point mechanism is provided for checking the column of bodies and delivering them one at a time in front of the cleats 10.

In the present organization of the machine, the conveyor chain is driven intermittently by suitable mechanism, such as a Geneva wheel 23 on shaft 9 cooperating with a stop segment 24, arm 25 and driving pin 26 on a parallel shaft 27. Shaft 27 is driven at reduced speed from a main drive shaft 28 by a pinion 29 and gear 30. The main drive shaft is driven in any suitable way, for instance, by belt pulley 31 controlled by clutch mechanism, such as 32, and a shifting lever 33 having a handle 34 convenient to the operator at the front end of the machine.

Figure 1:
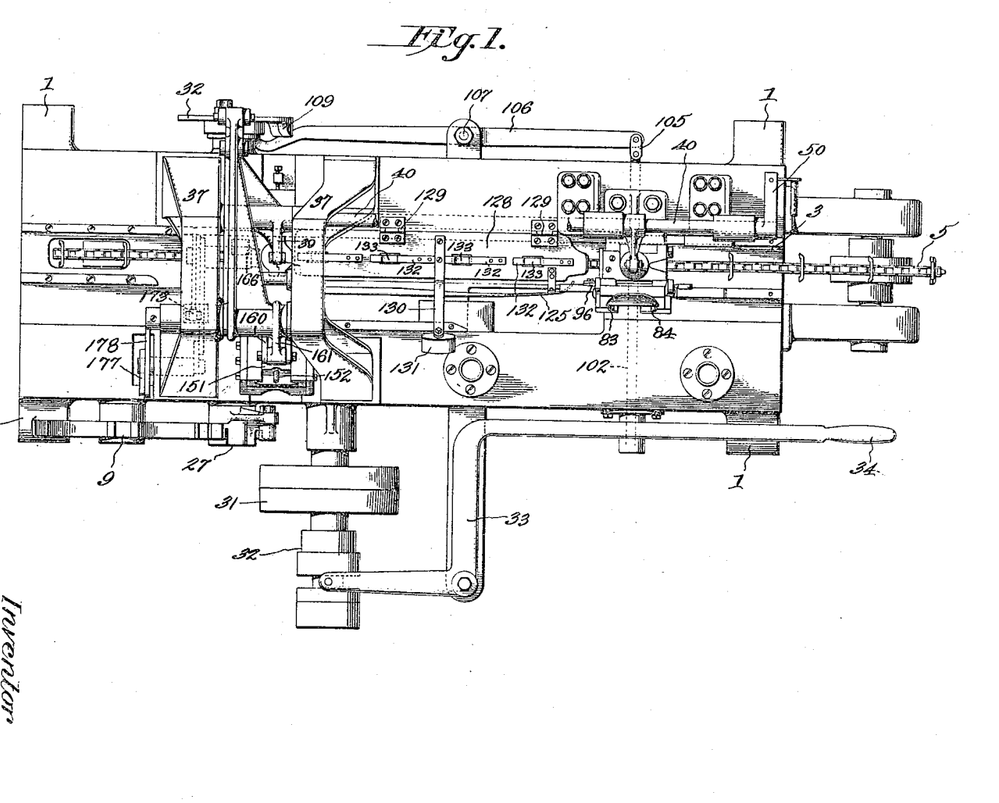
Fig. 1 is a top plan of a machine embodying the invention.

Shaft 27 carries at one end (Figs. 1, 3 and 7) a cam body 32$^a$ provided with a crank pin 33$^a$ connected to a pitman or connecting link 34$^a$, details of which are described hereafter. The upper end of the pitman 34$^a$ is connected to a lever 35 fulcrumed at 36 on a frame bridge member 37. Lever 35 is connected by a short link 38 to another lever 39 fulcrumed on a shaft 40, which has bearings in the frame bridge 37 and in frame uprights 41 and 42 near the feed end of the machine.

By the described arrangement shaft 40 is oscillated in timed relation to the intermittent movement of the feed chain and performs various functions described hereafter and also controls the delivery of the box bodies to the conveyor chain, as presently described.

Figures 9, 12:
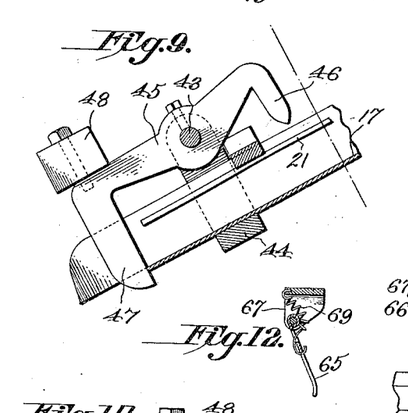
Fig. 9 is a detail in vertical section of the box body feed regulating mechanism.
Fig. 12 is a sectional detail of the yielding box stop at the same position.
Figure 10:
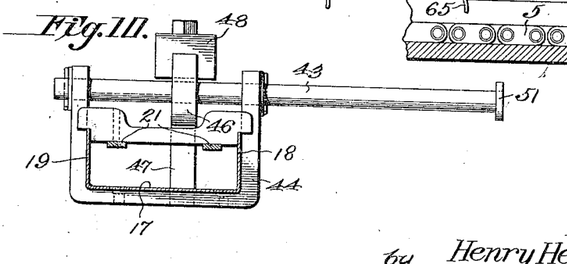
Fig. 10 is a transverse section of the same.

The box body feed mechanism previously mentioned includes a shaft 43 carried in bearings in the upper ends of a frame yoke 44 secured to trough 17, Figs. 2, 3, 8, 9 and 10. This shaft carries a feed control lever 45 located above the trough and provided with dependent lugs 46 and 47. The lever is loaded by a weight 48 and is oscillated in timed relation to the movements of the feed chain by connection with shaft 40, this connection being desirably in the form of a yieldable link consisting of a spring 49 connected between an arm 50 on shaft 40 and an arm 51 on shaft 43. In the position of the feed lever shown in Fig. 9 a box body rests against lug 47 and the rearward wall of the box is located beyond the end of lug 46 in the direction of movement of the bodies downward through the channel 17. When the conveyor chain 5 is in proper position with a feed lug 10 approaching the lower end of chute 17, shaft 40 is oscillated and by its connection with the shaft 43 the lever 45 is oscillated, raising lug 47 sufficiently to free the foremost box body, which slides down onto the feed chain in advance of the appropriate feed lug 10. At the same time lug 46 is depressed sufficiently to enter the open top of the next following box body, and checks that body by engagement with the rearward upstanding wall of the body. At the return of the lever 45 to normal position, as shown in Fig. 9, lug 46 is retracted from engagement with the box body which is now the foremost one in the channel, and the forward end of the body slides along until it engages the face of lug 47 and is thus retained ready for delivery to the feed conveyor at the next feed action.

Figure 11:
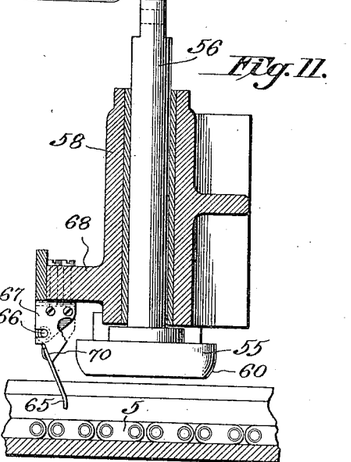
Fig. 11 is a vertical detail section of the box body positioning plunger or mandrel at the initial assembly position with certain associated details.

The box bodies are carried along in the channel 3 through one or more idle positions and a particular body is then brought below a positioning mandrel or plunger 55 at the initial assembly station. This plunger is carried by a rod 56 arranged to reciprocate in a bushing 57 located in a sleeve 58 carried by a frame member 59. The lower side walls of the plunger are incurved as at 60 to enable it to easily enter and fit the box body, which is shown in proper position in Fig. 5. The mandrel is prevented from rotating and guided in its movement by a flange 61 having a flat and straight face of considerable extent in vertical and longitudinal directions, engaging with a similar face formed on a lug 62 secured to the table. The plunger is reciprocated so that it enters the box at the proper time, by a link 63 connecting rod 56 to an arm 64 on shaft 40. To further assist in properly positioning the box body at this point, it is brought by the last portion of the conveyor movement against a yieldable stop 65, best shown in Figs. 11 and 12. This consists of an arm or blade pivotally mounted on a pin 66 secured in a yoke 67, secured to an extension 68 of the stationary sleeve 58. A spring 69, tensioned between arm 65 and a fixed point, normally positions the arm against a stop provided at 70 on the yoke. When the box body comes into position its advance wall engages the lower end of the arm 65 and moves it forward slightly and the spring 69 then acting through the arm holds the box firmly back against its feed lug 10, insuring that the box is properly positioned beneath the plunger 55.

Figure 6:
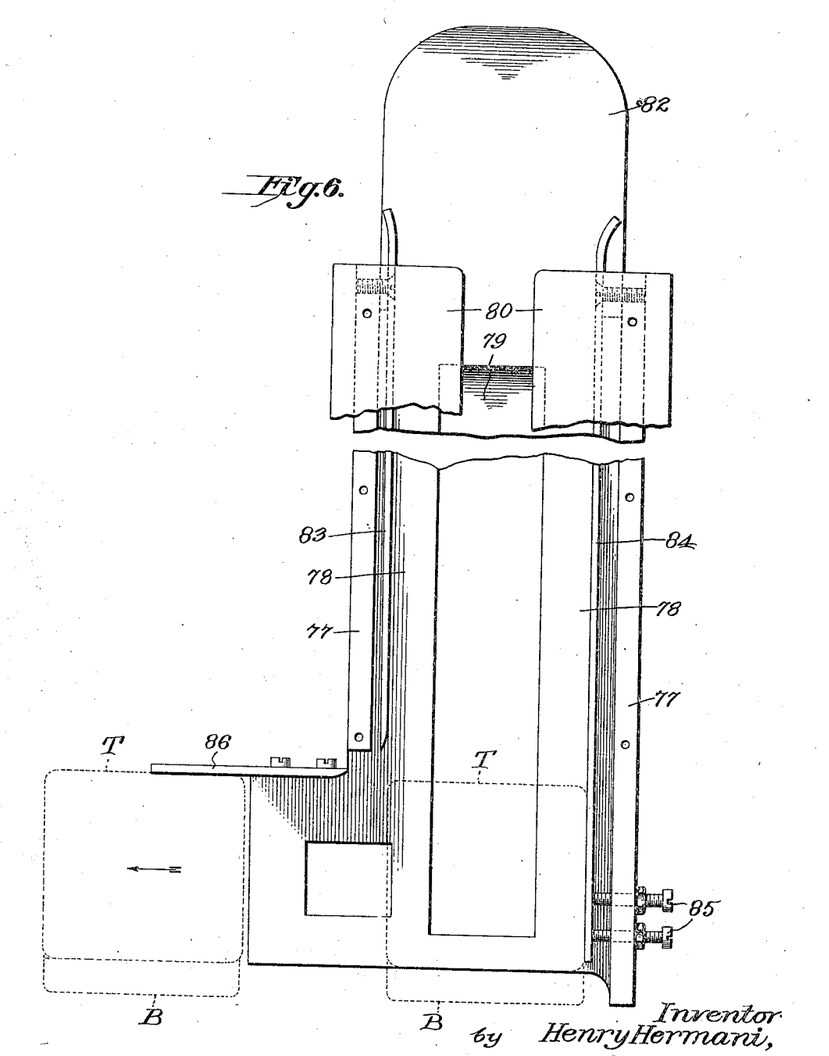
Fig. 6 is an enlarged side elevation of the box top feed chute.

The box tops T are arranged in a column in an upright chute 75 with the hinge hooks downward and with the open sides of the tops fronting toward the center line of the machine. The chute comprises a back plate 76 having side walls 77 provided with channels 78 to accommodate side portions of the tops, and the channel has a countersunk central portion 79 to accommodate the hinge hooks. The channels 78 are overlapped by plates 80 secured by screws 81, the plates constituting inwardly projecting flanges to retain the tops. The back plate 76 desirably has an upward continuation 82 extending above the upper ends of the plates or flanges 80 to facilitate placing the tops in the chute. Additional guide strips 83 and 84 may be located in the channels 78 and adjusted by suitable means, such as screws 85, to more closely fit the sides of the box tops and guide them in their descending movement. The side flanges 77 at one side of the chute and also the guide strip 83 at that side are discontinued at a suitable elevation, as best shown in Fig. 6, to permit the lateral discharge of the tops in the direction of the arrow. As the tops pass forward they are guided by a flange or guide rail 86.

To aid in arranging a quantity of tops near the chute and placing them in the chute, a trough 87 is desirably provided, supported by uprights 88, and this trough has a recess 89 in which the upper end of the chute is located. A quantity of box tops is placed in the trough and they are removed by the operator and rapidly inserted in the upper end of the chute and are then fed by gravity to the point of initial assembly as shown in Fig. 5, where the lowermost top T is in the bottom of the chute and its hooked end rests on a lifter 90, which is in the form of a T-head, on a bar 91 guided by a suitable recess in the table. The lowermost box top is adjacent to a plate 92 forming a continuation of back plate 76, and this guide plate has a beveled end 93. After a box body B comes to rest in the position shown in Fig. 5, the adjacent top T is moved inward by a pusher 94 carried by an arm 95 pivoted at 96 on the back plate 76. The pusher is moved by a depending arm 97 which has an upper horizontal offset 98, and the lower end of arm 97 is formed with a fork 99, the branches of the fork having rounded ends 100 engaging in a shifting groove 101, on a reciprocating rod 102. This rod is mounted in sleeve bearings at 103 and 104, Fig. 4, and one of its ends is connected by links 105 to a lever 106 fulcrumed at 107 and provided with a cam roller engaging a cam 109 on cam body 32ª, previously mentioned. In this way at the proper moment in the cycle of the machine the pusher 94 is moved inward and forces the box bod against the guide plate 93 and moves the end of the straight hinge hook portion t past the pintle and under the space between the pintle and the adjacent wall of the box body. It is desirable in some cases to provide a certain amount of lost motion in the operating linkage of the pusher to insure proper positioning of the box top without injury to other parts, and for this purpose the arm 97 may be yieldably connected to the pusher, for instance, by pivoting the angular member 98 of the arm on a pin 110, secured in the pusher body, and by connecting the arm 97 to the pusher body by a bent strap spring 111.

It is sometimes necessary to remove the pusher 94 with its connected parts, and to permit this to be done easily and quickly the table aperture 200 may be made only wide enough to accommodate the upright arm 97, but it is long enough to permit passage of the shifting fork 99 when the latter is turned part way around so that the plane of the fork is lined up with the long dimension of the aperture. The pivot pin 96 of the pusher supporting arm may be made readily removable or secured only by friction, and by removing this pin and turning the pusher assembly one-quarter way around it may be lifted out of the machine and any box part that is jammed at the initial assembly station may then be readily removed or repositioned and the pusher reinserted without any considerable delay.

Figure 4:
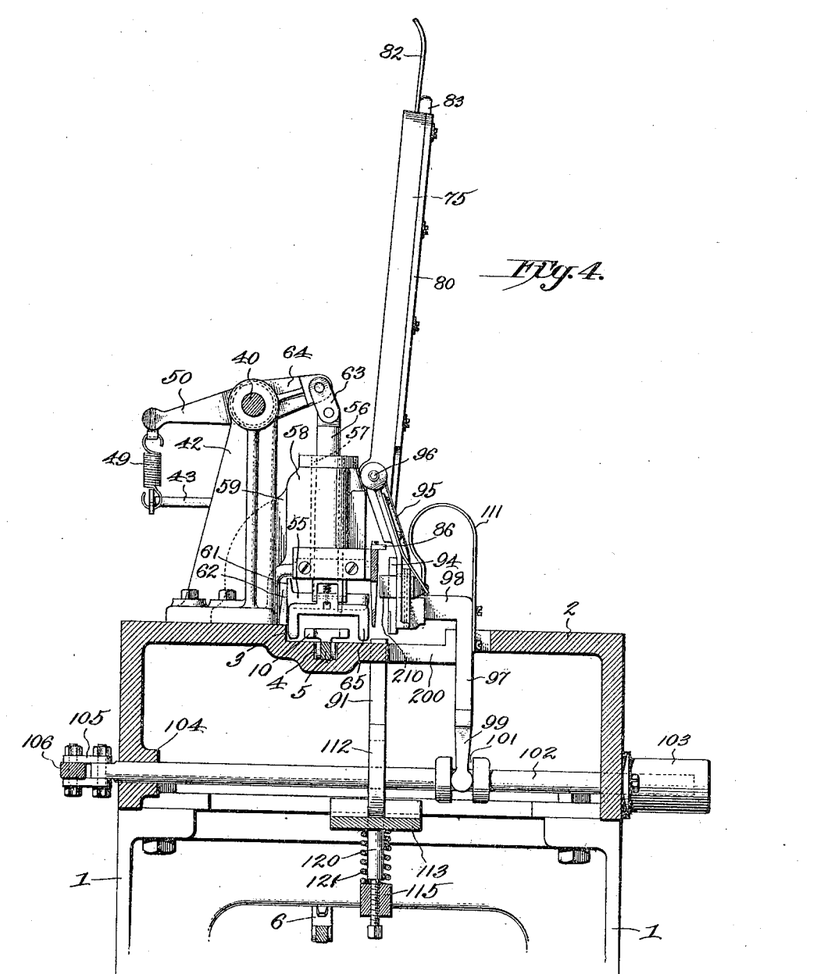
Fig. 4 is a vertical section in a plane slightly rearward of the initial assembly position and looking forward, that is toward the feed end of the machine which is at the right in Fig. 1.
Figure 5:
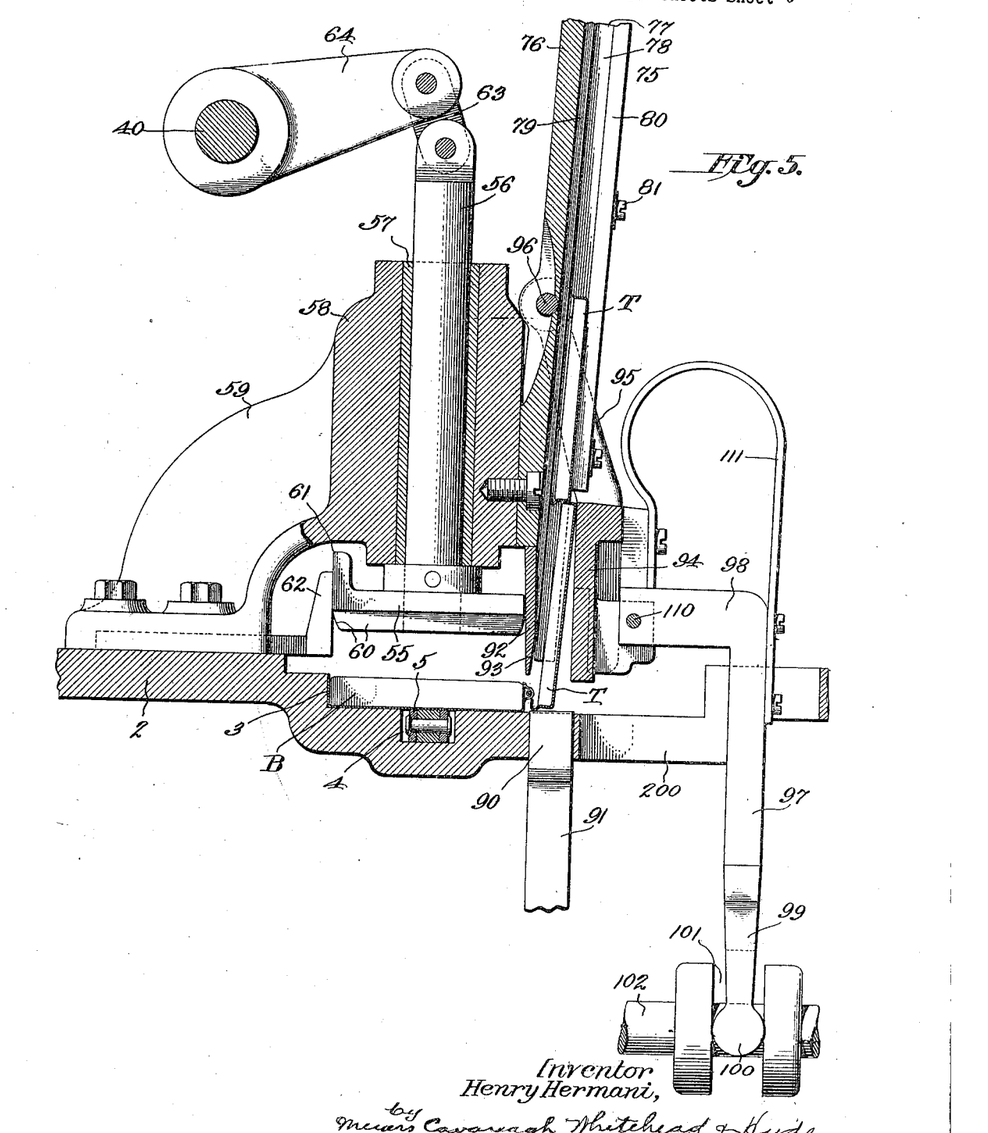
Fig. 5 is an enlarged vertical section at the initial assembly position.
Figures 15, 16:
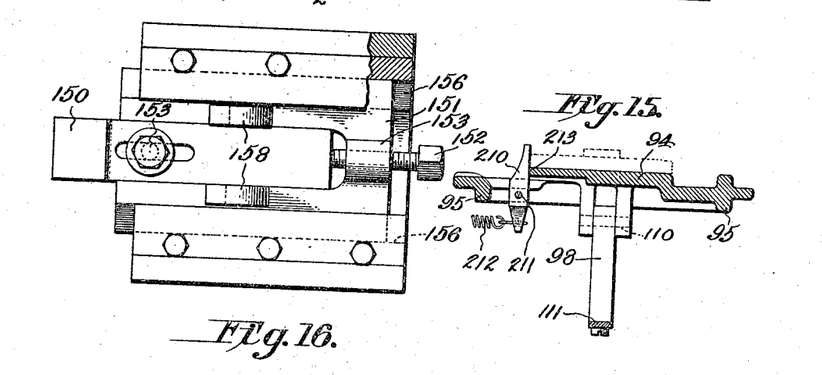
Fig. 15 is a detail of a yielding box stop.
Fig. 16 is a detail of the clenching plunger and its slide.

To properly hold the tops in position adjacent to the assembly station a yieldable stop 210 is desirably provided, located on the pusher 94 (Figs. 2, 4 and 15). This stop positions the top as shown in Figs. 6 and 15, and prevents it from being dislocated toward the left, that is toward the rear of the machine. Since the guide strip 83 is discontinued above the box top position, as shown in Fig. 6, without the provision of this stop or an equivalent device the tops might in some cases be dislocated during assembly operation. The stop 210 is pivoted at 211 and a spring 212 urges it to active position against an edge of the pusher plate at 213. After the assembly operation, when the assembly starts to move toward the next station the stop is rotated on its pivot sufficiently to permit the box top to advance and after passage of the top it springs back to active position ready to locate the next descending top.

Figure 18:
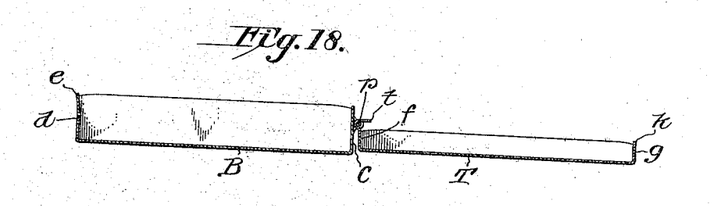

The box top is then elevated by raising the lifter 90, bringing the hinge hook into full engagement with the pintle, that is so that the pintle lies in the bend $b$ of the hinge hook, as shown in Fig. 17. The bar 91 which carries the lifter is formed with a loop at 112 to avoid conflict with rod 102 and the lower end of the rod rests on a flat lever 113, secured to the frame of the machine at 114. This lever is actuated by another lever 115 fulcrumed at 116 in a frame fitting, and this lever extends toward the rear of the machine where it is provided with a cam roller 117 engaging a cam 118 on shaft 27. The connection between lever 115 and lever 113 is desirably by means of a tappet 120 and a spring 121 to take up clearance between the levers and provide for a certain degree of lost motion. While the box top is still held in elevated position by the lifter 90 and after plunger 55 is withdrawn, the conveyor chain moves forward and the upper portion of the box top, moving forward with the box body B comes against a guide rail 125, and this rail is curved so that the top gradually drops downward to horizontal position, as shown in Fig. 18, and the parts slide along in the same relative position through several idle positions of the conveyor until they arrive at the hinge clenching station.

Figure 13:
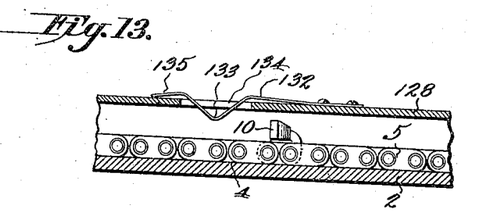
Fig. 13 is a detail of the conveyor at a point between the assembly and hinge clenching position.

To prevent the swinging of the assembled body and top and displacement from the conveyor, the bodies as they leave the initial assembly position pass beneath a horizontal guard plate 128 pivotally secured by hinges 129 to the table. This plate has an arm 130 provided with a weight 131 to retain the guard plate yieldably in position above the box bodies. To retain the bodies in proper position against their pushing lugs or cleats 10, spring clips 132 are provided in the form of strips of spring metal, Fig. 13, each secured at one end to the guard plate 128 and having an angular bent portion 133 depending through a slot 134 in the plate, and each clip also has its free end 135 extended to rest on the plate and limit downward movement of the angular portion 133. The angular members 133 engage the box bodies and yieldingly hold them back against the lugs 10 and so prevent any improper displacement of the assemblies as they move forward to clenching position.

Figure 7:
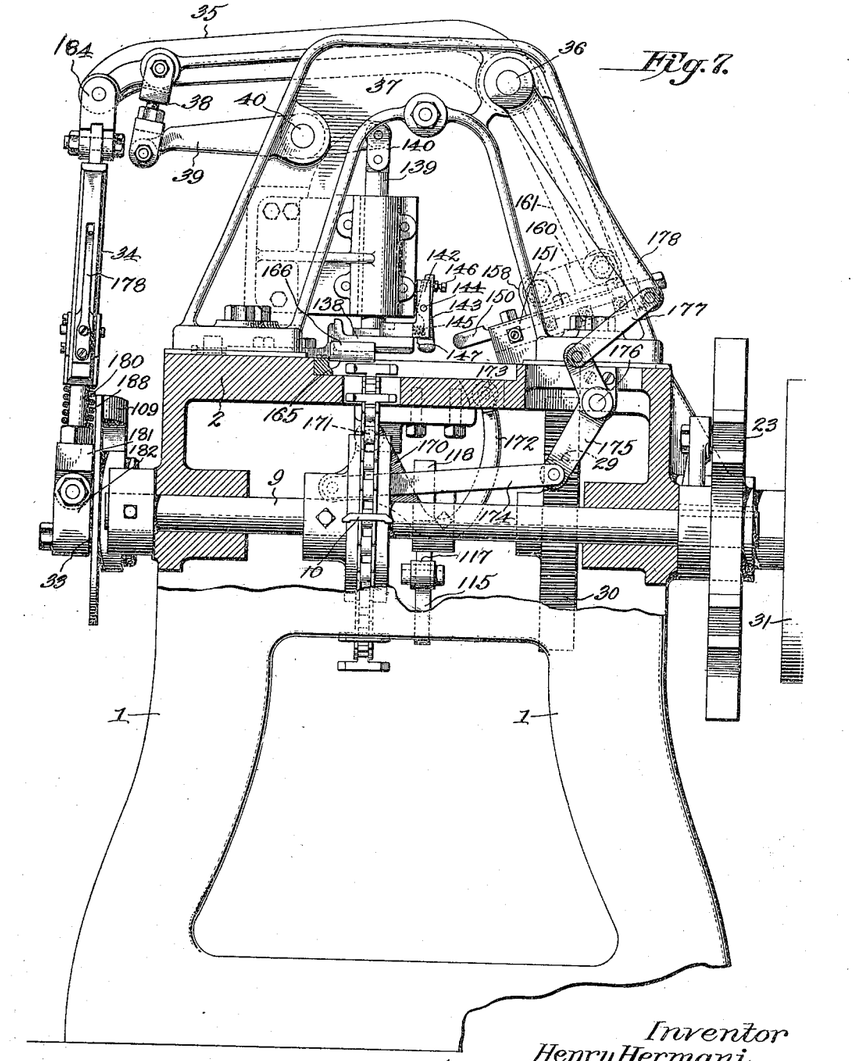
Fig. 7 is a vertical transverse section at a point back of the hinge clenching position and looking forward.
Figure 19:
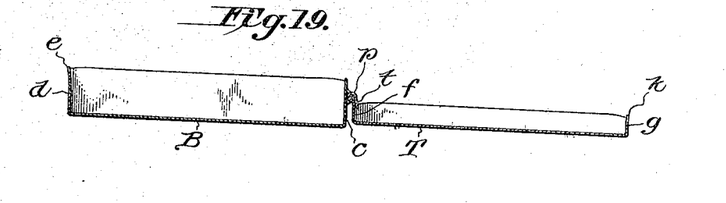

At the clenching position, as best shown in Fig. 7, a mandrel or plunger 138 is provided, which is substantially similar to plunger 55 previously described, and may be similarly supported and guided. Particularly in this instance the plunger 138 is carried by rod 139 connected by a link 140 to the inward end of lever 39, previously mentioned. Thus, after the box assembly is in position beneath the plunger, the plunger is depressed and enters the box by the action of the linkage including lever 39, link 38, lever 35 and pitman 34ª. The plunger is provided with an extension 142 in which is pivotally mounted a clenching lever 143 fulcrumed at 144 and normally retracted by a spring 145 to a position regulated by an adjustable screw stop 146. The clenching lever has a jaw provided with a recess 147. When the plunger descends the clenching jaw is brought opposite the horizontally extending end of the hinge hook portion *t*, and the jaw is then moved inward and the hinge connection is completed by bending the portion *t* about the pintle, as shown in Fig. 19. The clenching jaw is moved for this operation by a plunger 150, adjustably located on a slide 151, Fig. 16. The outer end of the plunger is engaged by a screw 152, passing through an eye 153 in the slide. The plunger is adjusted to proper position by rotating the screw and is then locked by a set screw 153 passing through a slot in the plunger and engaging in the slide. The slide moves in a guideway 156, this guideway being formed in a guide block 157 secured to the frame. The slide is provided with eyes 158 through which passes a pin connecting the slide pivotally by means of a link 160 to arm 161 of lever 35 previously mentioned. At the proper time lever 35 is oscillated and the slide is moved inward, moving the inward end of plunger 150 into engagement with the outer face of the clencher jaw and the clenching operation is performed in the manner previously described.

The box assembly may be located at the clenching position by a spring device, such as 65, previously described in connection with the assembly operation, or other suitable means may be provided to aid in locating the assembly at clenching position when necessary or desirable.

Figure 14:
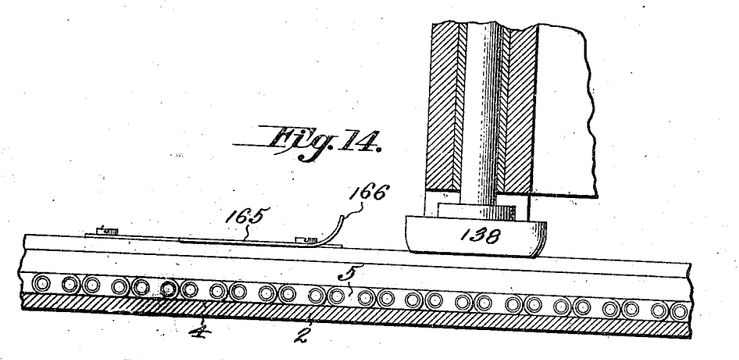
Fig. 14 is a detail of parts adjacent to the clenching position.
Figure 20:
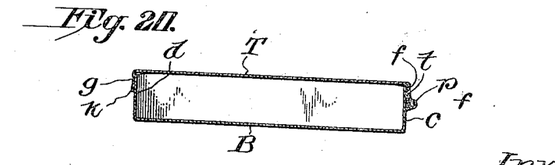

The plungers 150 and 138 being withdrawn, the completely hinged box is advanced by the conveyor beneath a guard strip 165, Fig. 14, the forward end of this strip being curved upward as at 166, to readily admit the box body beneath it. At a suitable subsequent conveyor position, which may be the next position of rest of the conveyor, means are desirably provided for closing the box, consisting in the present instance of a lever 170, fulcrumed at 171, and provided with a curved arm 172 arranged to pass through an aperture in the table and provided at its end with a roller 173. The lever is oscillated by a link 174 connected to a lever 175 fulcrumed at 176 and this lever is in turn connected by a lever 177 to a lever arm 178 secured to an end of shaft 36 on which lever 35 is secured. By these connections lever 170 is oscillated and roller 173 engages the flat box top and turns it pivotally about the hinge axis and finally the top drops to closed position, as shown in Fig. 20. The completed and closed boxes are then discharged at the rear end of the conveyor.

In some cases boxes are improperly located or jammed at the clenching position, or elsewhere through their course in the machine, and to provide for these contingencies and other obstructions to operative parts of the machine, it is desirable to provide yielding means to prevent damage in such cases. In the present embodiment such a yielding connection is provided in the pitman 34ª, previously mentioned (see Figs. 3 and 7). The lower portion of the pitman for this purpose consists of a steam 180 connected by "universal" links 181 and 182, to the crank pin 33ª on cam body 32ª. The stem passes through a sleeve formed in the lower end of a rectangular frame 183, constituting the upper portion of the pitman. This frame is connected by a link 184 to the end of lever 35. The links 181, 182 and 184 are arranged to accommodate the complex relative movement of the crank pin 33ª and the end of lever 35. Within the frame 183 the upper end of stem 180 is pivotally connected to a lever 185 which has a toe or projection 186 engaging a notch in one side of the frame. The upper end of the lever is acted upon by a spring 187 to maintain the toe 186 in the notch, and to resist with considerable force the displacement of the toe. A spring 188 is arranged about the stem 180 between a collar on the stem and the lower end of frame 183. In the active movement of the pitman, which occurs during the upward movement of the crank pin 33$^a$, as viewed in Fig. 3, under normal conditions, the parts are located as shown in that figure, and the drive through the pitman is positive; but when there is any undue obstruction to the movement of the lever 35 or parts connected to it, the movement of frame 183 is retarded and in the continued upward movement of the crank pin 33$^a$ the toe 186 is forced out of its notch against the resistance of spring 187 and the lower portion of the pitman then continues to move upward with accompanying compression of spring 188, while the upper portion of the pitman remains stationary and damage to the machine or boxes passing through it is prevented. An attendant corrects the difficulty, with or without stoppage of the machine, and in the further rotation of the crank pin 33$^a$ the parts return to normal position and the toe 186 again snaps into its notch and the machine then operates normally until the action of the machine is again obstructed.

Evidently in some cases the mechanism for closing the boxes may be dispensed with and the boxes may be discharged in open condition.

Evidently, also, novel features are embodied in the various feed, assembly and clenching mechanisms, and these features are valuable in themselves, in some cases, aside from their combination with other parts, as herein shown.

What I claim is:—

1. In a box assembling machine, means for advancing intermittently substantially flat box bodies in substantially horizontal position to an initial assembly point, means for delivering complemental box bodies successively in opproximately vertical position at the assembly position, and means for moving the covers laterally and interconnecting complemental portions of a box body and cover, while located at the assembly station, to produce a box assembly.

2. In a box assembling machine, a conveyor for advancing intermittently substantially flat box bodies in substantially horizontal position to an initial assembly point, means for advancing a column of box bodies and delivering them singly to the conveyor in spaced relation, means for delivering complemental box bodies successively in approximately vertical position at the assembly position, and means for moving the covers laterally and interconnecting complemental portions of a box body and cover, while located at the assembly station to produce a box assembly.

3. In a box assembling and hinging machine, means for intermittently advancing box bodies successively in substantially horizontal position to an initial assembly station, means for advancing a succession of box tops in a substantially vertical row in edgewise contact to the assembly station, means for moving the foremost top laterally to initially position a top hinge hook relative to a body hinge pintle, and means for thereafter lifting the top to complete engagement of the respective hinge members.

4. In a box assembling and hinging machine, a conveyor for intermittently advancing box bodies successively in substantially horizontal position to an initial assembly station, a descending chute for a column of box bodies in edge-wise contact, means for checking the bodies and delivering them singly to the conveyor, means for advancing a succession of box tops in a substantially vertical row in endwise contact to the assembly station, means for moving the advanced top laterally to initially engage a top hinge hook with a body hinge pintle, and means for thereafter lifting the top to complete engagement of the respective hinge members.

5. In a box assembling and hinging machine, means for intermittently advancing box bodies successively in substantially horizontal position to an initial assembly station, means for advancing a succession of box tops in a substantially vertical row in edgewise contact to the assembly station, means for moving the foremost top laterally to initially position a top hinge hook relative to a body hinge pintle, means for thereafter lifting the top to complete engagement of the respective hinge members, and means acting during subsequent advance of the interconnected body and cover to open the cover.

6. In a box assembling and hinging machine, a conveyor for intermittently advancing box bodies successively in substantially horizontal position to an initial assembly station, a descending chute for a column of box bodies in edgewise contact, means for checking the bodies and delivering them singly to the conveyor, means for advancing a succession of box tops in a substantially vertical row in endwise contact to the assembly station, means for moving the advanced top laterally to initially engage a top hinge hook with a body hinge pintle, means for thereafter lifting the top to complete engagement of the respective hinge members, and means acting during subsequent advance of the interconnected body and cover to move the cover to substantially horizontal position.

7. In a box assembling and hinging machine, means for intermittently advancing box bodies successively in substantially horizontal position to an initial assembly station, means for advancing a succession of box tops in a substantially vertical row in edgewise contact to the assembly station, means for moving the foremost top laterally to initially position a top hinge hook relative to a body hinge pintle, means for thereafter lifting the top to complete engagement of the respective hinge members, and means at a subsequent station to clench the top hinge hook about the body pintle.

8. In a box assembling and hinging machine, means for intermittently advancing box bodies successively in substantially horizontal position to an initial assembly station, means for advancing a succession of box tops in a substantially vertical row in edgewise contact to the assembly station, means for moving the foremost top laterally to initially position a top hinge hook relative to a body hinge pintle, means for thereafter lifting the top to complete engagement of the respective hinge members, means acting during subsequent advance of the interconnected body and cover to open the cover, and means at a subsequent station to clench the top hinge hook about the body pintle.

9. In a box assembling and hinging machine, means for intermittently advancing box bodies successively in substantially horizontal position to an initial assembly station, means for advancing a succession of box tops in a substantially vertical row in edgewise contact to the assembly station, means for moving the foremost top laterally to initially position a top hinge hook relative to a body hinge pintle, means for thereafter lifting the top to complete engagement of the respective hinge members, means at a subsequent station to clench the top hinge hook about the body pintle, and means acting at a subsequent position of the box assembly to close the box.

10. In a box assembling and hinging machine, means for intermittently advancing box bodies successively in substantially horizontal position to an initial assembly station, means for advancing a succession of box tops in a substantially vertical row in edgewise contact to the assembly station, means for moving the foremost top laterally to initially position a top hinge hook relative to a body hinge pintle, means for thereafter lifting the top to complete engagement of the respective hinge members, means acting during subsequent advance of the interconnected body and cover to open the cover, means at a subsequent station to clench the top hinge hook about the body pintle, and means acting at a subsequent position of the box assembly to close the box.

11. A box assembly and hinging machine comprising an intermittent conveyor, means for feeding box bodies successively to the conveyor, an initial assembly station, a plunger at that station adapted to enter box bodies successively presented by the conveyor and position them for assembly, an upright chute conveying a succession of complemental box bodies in edge contact to the assembly station where the lowermost top stands vertically adjacent to the horizontally presented body, a pusher for moving the box top laterally to effect initial positioning of hinge members of the two box parts, and a lifter to complete hinge engagement of the box parts.

12. A box assembly and hinging machine comprising an intermittent conveyor, means for feeding box bodies successively to the conveyor, an initial assembly station, a plunger at that station adapted to enter box bodies successively presented by the conveyor and position them for assembly, means for positioning the bodies before plunger engagement, an upright chute conveying a succession of complemental box bodies in edge contact to the assembly station where the lowermost top stands vertically adjacent to the horizontally presented body, a pusher for moving the box top laterally to effect initial position of hinge members of the two box parts, and a lifter to complete hinge engagement of the box parts.

13. A box assembly and hinging machine comprising an intermittent conveyor, means for feeding box bodies successively to the conveyor, an initial assembly station, a plunger at that station adapted to enter box bodies successively presented by the conveyor and position them for assembly, an upright chute conveying a succession of complemental box bodies in edge contact to the assembly station where the lowermost top stands vertically adjacent to the horizontally presented body, a pusher for moving the box top laterally to effect initial positioning of hinge members of the two box parts, a lifter to complete hinge engagement of the box parts, and top guide means acting to move the covers to open horizontal position during movement of the box assemblies away from the initial assembly station.

14. A box assembly and hinging machine comprising an intermittent conveyor, means for feeding box bodies successively to the conveyor, an initial assembly station, a plunger at that station adapted to enter box bodies successively presented by the conveyor and position them for assembly, an upright chute conveying a succession of complemental box bodies in edge contact to the assembly station where the lowermost top stands vertically adjacent to the horizontally presented body, a pusher for moving the box top laterally to effect initial positioning of hinge members of the two box parts, a lifter to complete hinge engagement of the box parts, top guide means acting to move the corners to open horizontal position during movement of the box assemblies away from the initial assembly station, and means at a subsequent station for permanently connecting the hinge members.

15. A box assembling and hinging machine comprising an intermittent conveyor for moving box bodies horizontally and flatwise, means for supplying box bodies successively to the conveyor, means for feeding box tops successively in vertical position to a point adjacent the conveyor and engaging a box top hinge hook with a hinge pintle of each successive box body, means at a subsequent station for clenching the hinge hooks, and means intermediate the assembly and clenching stations for guiding the successive box assemblies and retaining them in proper position on the conveyor.

16. A box assembling and hinging machine comprising an intermittent conveyor for moving box bodies horizontally and flatwise, means for supplying box bodies successively to the conveyor, means for feeding box tops successively in vertical position to a point adjacent the conveyor and engaging a box top hinge hook with a hinge pintle of each successive box body, means at a subsequent station for clenching the hinge hooks, means intermediate the assembly and clenching stations for guiding the successive box assemblies and retaining them in proper position on the conveyor, and means for moving the tops to horizontal position as the assemblies advance.

17. A box assembling and hinging machine comprising an intermittent conveyor for moving box bodies horizontally and flatwise, means for supplying box bodies successively to the conveyor, means for feeding box tops successively in vertical position to a point adjacent the conveyor and engaging a box top hinge hook with a hinge pintle of each successive body, means at a subsequent station for clenching the hinge hooks, a movable guard plate overlying the conveyor between the assembly and clenching stations, and means yieldingly urging the guard plate to normal position close above the box bodies located on the conveyor.

18. A box assembling and hinging machine comprising an intermittent conveyor for moving box bodies horizontally and flatwise, means for supplying box bodies successively to the conveyor, means for feeding box tops successively in vertical position to a point adjacent the conveyor and engaging a box top hinge hook with a hinge pintle of each successive box body, means at a subsequent station for clenching the hinge hooks, a guard plate located above the conveyor between the assembly and clenching stations, and one or more yieldable box retarding devices acting on successive assemblies to retain them in proper position on the conveyor.

19. A box assembling and hinging machine comprising an intermittent conveyor for moving box bodies horizontally and flatwise, means for supplying box bodies successively to the conveyor, means for feeding box tops successively in vertical position to a point adjacent the conveyor and engaging a box top hinge hook with a hinge pintle of each successive box body, means at a subsequent station for clenching the hinge hooks, a guard plate located above the conveyor between the assembly and clenching stations, and one or more yieldable box retarding devices located on the guard plate and acting on successive assemblies to retain them in proper position on the conveyor.

20. A box assembling and hinging machine comprising means for producing successive box assemblies, each consisting of a body provided with a hinge pintle and a top provided with a hook loosely engaged with the pintle and moving the assemblies successively to a clenching station, and means at that station for locating a box body for clenching, a hinge hook clenching jaw, a plunger for operating the jaw, and means for moving the plunger.

21. A box assembling and hinging machine comprising means for producing successive box assemblies, each consisting of a body provided with a hingle pintle and a top provided with a hook loosely engaged with the pintle and moving the assemblies successively to a clenching station, a box body retaining plunger adapted to enter box bodies at the clenching station, a hinge hook clenching jaw thereon, and positioned in relation to the box top hinge hook in the movement of the plunger to box retaining position, a clencher jaw actuating plunger arranged for movement toward and from the clencher jaw, and means for moving the actuating plunger while the box assembly is located at clenching position, to clench the top hinge hook about the body pintle.

22. A box assembling and hinging machine comprising means for producing successive box assemblies, each consisting of a body provided with a hinge pintle and a top provided with a hook loosely engaged with the pintle and moving the assemblies successively to a clenching station, a box body retaining plunger adapted to enter box bodies at the clenching station, a hinge hook clenching jaw pivotally mounted on the plunger, and positioned in relation to the box top hinge hook in the movement of the plunger to box retaining position, a clencher jaw actuating plunger arranged for movement toward and from the clencher jaw, a slide carrying the plunger, guides for the slide, and means for moving the slide while the box assembly is located at clenching position to clench the top hinge hook about the body pintle.

23. A box assembling and hinging machine comprising means for producing successive box assemblies, each consisting of a body provided with a hinge pintle and a top provided with a hook loosely engaged with the pintle and moving the assemblies successively to a clenching station, means at that station for locating a box body for clenching, a hinge hook clenching jaw, a plunger for operating the jaw, means for moving the plunger, box top closing means acting on the box tops at a station subsequent to the clenching station, and means for operating said closing means.

24. A box assembling and hinging machine comprising means for producing successive box assemblies, each consisting of a body provided with a hinge pintle and a top provided with a hook loosely engaged with the pintle and moving the assemblies successively to a clenching station, and means at that station for locating a box body for clenching, a hinge hook clenching jaw, a plunger for operating the jaw, means for moving the plunger, a closing lever located at a station subsequent to the clenching station, a curved arm carried by the lever, a box engaging member carried by the arm, and means for operating the lever.

25. A box assembling and hinging machine comprising means for producing successive box assemblies, each consisting of a body provided with a hinge pintle and a top provided with a hook loosely engaged with the pintle and moving the assemblies successively to a clenching station, and means at that station for locating a box body for clenching, a hinge hook clenching jaw, a plunger for operating the jaw, means for moving the plunger, a closing lever located at a station subsequent to the clenching station, a curved arm carried by the lever, a box engaging member carried by the arm, and means interconnected with the operating mechanism of the clencher plunger for operating the lever.

Signed at Baltimore, State of Maryland, this 14th day of September, A. D. 1921.

HENRY HERMANI.